United States Patent
Kröner et al.

(10) Patent No.: US 6,498,219 B1
(45) Date of Patent: Dec. 24, 2002

(54) METHOD FOR CONTINUOUSLY MONITORING AND CONTROLLING THE MONOMER CONVERSION DURING EMULSION POLYMERIZATION

(75) Inventors: Hubertus Kröner, Neustadt (DE); Rainer Klostermann, Ketsch (DE); Joachim Birk, Limburgerhof (DE); Thomas Hauff, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/890,968

(22) PCT Filed: Feb. 11, 2000

(86) PCT No.: PCT/EP00/01091

§ 371 (c)(1),
(2), (4) Date: Aug. 8, 2001

(87) PCT Pub. No.: WO00/47632

PCT Pub. Date: Aug. 17, 2000

(30) Foreign Application Priority Data

Feb. 11, 1999 (DE) .......................................... 199 05 712

(51) Int. Cl.⁷ .................................................. C08F 2/22
(52) U.S. Cl. .......................................... 526/61; 526/59
(58) Field of Search ...................................... 526/59, 61

(56) References Cited

U.S. PATENT DOCUMENTS 2,803,623 A * 8/1957 Anderson, Jr. ................ 526/61
3,991,258 A 11/1976 Beckingham et al.

FOREIGN PATENT DOCUMENTS

DE 20 61 444 6/1972

* cited by examiner

*Primary Examiner*—Fred Teskin
(74) *Attorney, Agent, or Firm*—Oblon, Spivak, McClelland, Maier & Neustadt, P.C.

(57) ABSTRACT

A method of on-line monitoring and control of monomer conversion in emulsion polymerization includes continuously balancing, as from an initialization time, the heat $Q_{IN}$, introduced into the reactor, the reaction enthalpy $Q_{RE}$ introduced via the monomer feed, and the heat which has been removed from the reactor $Q_{OUT}$, and calculating an amount of heat which has not been removed $Q_{AD}$ which would lead to an increase in the internal temperature and the internal pressure of the reactor in the event of a spontaneous adiabatic reaction. A check is carried out as to whether the potential adiabatic temperatures and pressures always lie below prescribed upper limits. If the upper limits are exceeded, the monomer feed to the reactor is throttled back or interrupted.

11 Claims, 1 Drawing Sheet

METHOD FOR CONTINUOUSLY MONITORING AND CONTROLLING THE MONOMER CONVERSION DURING EMULSION POLYMERIZATION

The present invention relates to a method of on-line monitoring and control of monomer conversion in emulsion polymerization in a reactor, in particular in semicontinuous and continuous emulsion polymerization processes on an industrial scale.

Safety aspects play a prominent role in production processes in chemical industry. Chemical production processes are therefore usually monitored continually in order to avoid possible dangerous situations which could lead to explosions or to release of chemicals.

Many chemical reactions, for example emulsion polymerization, proceed exothermically and are therefore associated with the liberation of heat. If, in such a reaction system, less heat is removed than is generated by reaction of the starting materials the resulting temperature rise in the system can lead to a self-accelerating reaction. This is referred to as a "runaway" reaction. In a closed reactor system, a temperature rise is also associated with an increase in the internal pressure in the reactor.

A reactor for exothermic chemical reactions therefore has, in addition to cooling devices for efficient removal of heat, specific safety devices for release of pressure, for example safety valves or special "catch tank" systems which make it possible for the contents of the reactor to be quickly emptied into a safety tank. As a basic safety requirement, the process should always be carried out in such a way that the safety devices are not actuated even under unfavorable conditions, i.e. in the case of a spontaneous, adiabatic runaway reaction of the mixture present in the reactor. To realize this basic principle, reaction monitoring aided by the process control system is usually provided. The essential task of this reaction monitoring is to ensure the safety of the process and to limit the process risk at every point in time during the reaction in the running process.

Up to now, reaction monitoring has usually been based on fixed apparatus-dependent and formulation-independent limit values for feed amounts and/or rates for the starting materials and on monitoring of temperature differences.

These fixed limit values necessitate very large safety margins; optimization of the process conditions in terms of economics is only possible within narrow limits in the case of such concepts.

However, to optimize the space-time yield while maintaining plant safety, it is necessary to replace these rigid limit values by more flexible limit values based on up-to-date measurements while the reaction is running.

In emulsion polymerization, the starting materials (essentially monomers, emulsifiers, water, initiators and stabilizers) are introduced according to a predetermined addition strategy into the reactor where the emulsified monomer droplets are converted into polymer particles with liberation of heat.

Continuous reaction monitoring of emulsion polymerization therefore consists essentially of two elements:

monitoring of a threatened runaway reaction by actuating an alarm if a particular maximum internal temperature in the reactor is exceeded; and monitoring/actuation of an alarm in the case of monomer accumulation.

An accumulation of monomers in the reactor is, firstly, associated with the risk of the reaction ceasing. However, an accumulation of monomers at the same time also represents an incalculable safety risk should an adiabatic runaway reaction of the reaction mixture occur. Reliable reaction monitoring therefore requires that the reaction enthalpy present in the reactor as a result of accumulative monomers but not yet liberated be known exactly at every point in time.

Various methods of monitoring monomer accumulation are already known.

In the "de Haas" reaction monitoring method, the setting of the regulating valves for steam and cooling water supply to the temperature-control bath of the reactor is monitored. This variant has the advantage that it can be implemented relatively simply. It employs instrumentation which is already present for controlling the reaction. However, for this same reason, the method cannot be used as a safety device of requirement class 5 (DIN 19250 or SIL III as per IEC 61508). In addition, certain effects such as reactor fouling or a deterioration in heat removal if the viscosity of the reaction mixture rises cannot be taken into account. The increase in the internal pressure in the reactor which occurs in the case of a runaway reaction is also not taken into account. Furthermore, this method of reaction monitoring reaches its limitations in the case of reactions which are provided with a relatively complex regulation strategy.

A further known method of monitoring monomer accumulation is to monitor the minimum initially charged amount of inerts (for instance deionized water) and the maximum flow for the monomer feed. However, this monitoring method allows only a relatively restricted flexibility with regard to the formulations and the operating procedure for the reactor. In itself it is not sufficient for monitoring the start of the reaction or a cessation of the reaction and must therefore be combined with organizational measures and, if appropriate, the "de Haas" reaction monitoring method. This method also does not explicitly take into account pressures which may possibly occur. This method is unfavorable from an economic point of view since, owing to the rigid limit values for amounts, relatively large safety margins have to be allowed.

A further known method is to monitor the temperature difference between the internal reactor temperature and the reactor bath temperature after reaching a "worst case" amount. The "worst case" amount is the maximum amount of monomers which can be permitted to run into the reactor without occurrence of a polymerization reaction while still leading to conditions within the safety margins in the case of a runaway reaction. The "worst case" amount can be determined on the basis of measured flows with the aid of a model. The calculation is then carried out by means of a simplified heat balance which takes into account only the introduced heat flows. However, this method, too, does not explicitly take into account pressures which possibly occur in the case of a runaway reaction. The monitoring of a rigid limit value for the temperature difference between internal reactor temperature and reactor bath temperature does not take into account the influences of reactor fouling and the viscosity. In addition, this method has only restricted usability in the case of reactors having extended cooling opportunities such as external heat exchangers or reflux condensers.

SUMMARY OF THE INVENTION

It is an object of the present invention to provide an improved method of on-line monitoring and control of monomer conversion in emulsion polymerization, which method makes possible more economical process conditions combined with unaltered, high plant safety and, in particular, is also usable for reactors having extended cooling opportunities and in processes having complex regulation strategies.

We have found that this object is achieved by the method described in claim 1. The method of the invention comprises a) selecting an initialization time $t_0=0$ and assigning a particular original heat content $Q_0$ to the reactor for this point in time, b) as from the initialization time, continuously determining the heat $Q_{IN}$, introduced into the reactor, the reaction enthalpy $Q_{RE}$ introduced and the heat $Q_{OUT}$ removed from the reactor, c) calculating the heat which has not been removed $Q_{AD}$ according to the following balance $$Q_{AD}(t)=Q_0+Q_{IN}(t)+Q_{RE}(t)-Q_{OUT}(t),$$

d) calculating the maximum internal temperature $T_{AD}$ which occurs in the case of a spontaneous adiabatic reaction from the heat which has not been removed $Q_{AD}(t)$ and the instantaneous internal temperature $T(t)$ of the reactor and, e) if the calculated maximum internal temperature $T_{AD}$ exceeds the instantaneous internal temperature $T(t)$ of the reactor by a particular margin, implementing measures which prevent a further rise in the heat which is not removed $Q_{AD}$.

The invention thus proposes improving the monitoring of monomer accumulation by introducing an expanded heat balance which takes into account the heat which is removed. The heat which has not been removed $Q_{AD}$, which represents the instantaneous hazard potential, can be determined more accurately and certain parameters relevant to reactor safety, e.g. the maximum adiabatic internal temperature $T_{AD}$ of the reactor, can be calculated more precisely. The safety margins to be maintained before actuation of safety valves or catch tank systems can therefore be better exploited. The continuous determination of the instantaneous conversion and the current hazard potential enables feed rates to be adapted and the space-time yield to be optimized. The heat balance proposed according to the present invention can also be carried out in the case of reactors having external heat exchangers or reflux condensers, since these are technically simple to include in the balance. Moreover, rigid limit values for the maximum feed rate or maximum amounts of starting components do not have to be adhered to. Likewise, rigid limit values for temperature differences between the reactor interior and the bath are no longer necessary. The continuous measurement of the actual amount of heat removed also gives information on reactor fouling or viscosity changes.

A variety of measures are conceivable for preventing a rise in the amount of heat which has not been removed. Preference is given to using one or more of the following measures:

throttling back of the monomer feed, increasing reactor cooling, for example via the reactor bath or via a reflux condenser, increasing the initiator addition to achieve better conversion of the accumulated monomers.

Since some of these measures can affect the product quality, particular action strategies influenced by prescribed specifications to be adhered to will be selected on a case-by-case basis.

The heat introduced, the reaction enthalpy and the heat removed from the reactor are advantageously determined by means of temperature and mass flow measurements in the inflow lines and outflow lines of the reactor and in the coolant circuits. Reliable and inexpensive measuring systems are commercially available for temperature and mass flow measurements. If the specific heat capacities of the starting materials are known, the heat flows can be calculated easily. Thus, no relatively large capital costs are associated with the method of the present invention. The method can also be easily implemented in existing plants.

Particular preference is given to additionally calculating the maximum internal pressure $p_{AD}$ prevailing in the reactor at the maximum internal temperature $T_{AD}$. In this preferred variant of the method of the present invention, the maximum internal pressure in the reactor occurring even in the case of an adiabatic runaway reaction of the mixture in the reactor is employed as an additional safety criterion, so that increased plant safety compared to conventional monitoring methods is obtained. It is therefore advantageous to implement measures which prevent a further rise in the heat which has not been removed $Q_{AD}$ if either the calculated maximum internal temperature $T_{AD}$ or the calculated maximum internal pressure $p_{AD}$ exceed the corresponding measured instantaneous values by a particular amount. This variant of the present invention is particularly preferred because $p_{AD}$ is more likely to be exceeded than $T_{AD}$ in the case of a reaction malfunction.

Advantageously, further introduction of monomers into the reactor is completely prevented if the calculated maximum internal temperature $T_{AD}$ and/or the calculated maximum internal pressure $p_{AD}$ exceed prescribed, reactor-specific limit values. As limit values for reaction monitoring, it is possible to employ the design temperature of the reactor or the design pressure of the reactor or of a safety valve which may be present, taking into account the error tolerances of the calculation. With the interruption of the monomer feed, no reaction enthalpy is introduced into the reactor either, so that the conditions prevailing in the reactor are always within the prescribed tolerances. Continued cooling of the reactor then effectively removes heat and, after a certain cooling time, the feed can be reopened if appropriate.

As initialization time for the method of the present invention, a point in time at which the reactor is completely empty is preferably selected and this time is assigned to the original heat content $Q_0=0$.

This initialization can be carried out manually by the operators. However, to avoid human error, the initialization is preferably carried out automatically; for example, after opening the drainage valve for a certain minimum time, it can be assumed that the reactor is completely empty so that automatic initialization can be carried out after this period of time. However, the emptying of the reactor can also be registered via a fill level sensor located in the reactor. The initialization criterion of a completely empty reactor can also be registered by measuring the amount of reaction medium which has run out of the reactor and balancing this with the amount previously fed into the reactor.

In addition, the method of heat balancing according to the present invention also makes it possible to monitor the instantaneous conversion of the reaction mixture and to validate the reactants fed in by calculating the reactor pressure and comparing this with the actual pressure in the reactor. For this reason, preference is given to measuring the actual internal pressure in the reactor $p(t)$ to validate the monitoring method and continuously checking adherence to the relationship $$p(t) \leq p_{calc}(t)$$

where $p_{calc}$ is the pressure calculated from the instantaneous internal temperature of the reactor.

When the reaction monitoring is installed as a safety device, preference is given to carrying out at least partially redundant temperature, pressure and flow measurements and carrying out continuous validation of the input parameters by comparison of the redundant parameters.

The monitoring method of the present invention can be used particularly advantageously in a semicontinuous emulsion polymerization process. In the case of a continuous polymerization process, the heat removed with the outflowing polymer also has to be included in the heat balance.

For reliable reaction monitoring by means of the heat balance proposed according to the present invention, it is particularly important for the reactor to be very well mixed during the reaction and for the monomers to react uniformly. For this reason, the operation of the reactor stirrer is preferably also monitored continuously. Uniform reaction of the monomers can be ensured in emulsion polymerization by the feed stream procedure.

BRIEF DESCRIPTION OF THE DRAWING

The method of the present invention is described in more detail below with reference to a polymerization reactor shown schematically in the accompanying drawing.

DETAILED DESCRIPTION OF THE INVENTION

Figure 1:
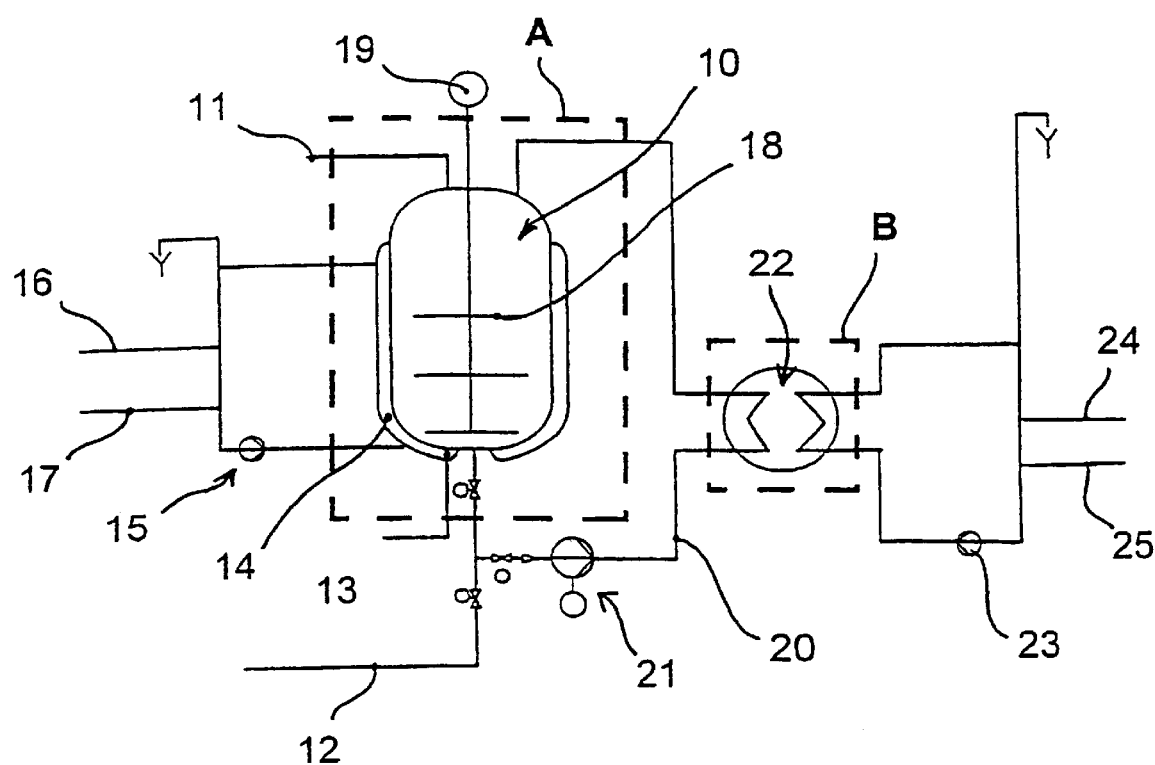

The drawing shows a reactor 10 which has feed lines 11 for starting materials such as monomers, emulsifiers, water, initiators, stabilizers and further auxiliaries. The reactor can be emptied via a line 12. Heat in the form of steam can be introduced into the reactor via a line 13. The reactor 10 is surrounded by a temperature control jacket 14 which is heated/cooled by means of a water circuit which runs via a first water circulation pump 15. A first steam line 16 and a first cooling water line 17 in turn allow the temperature of the cooling water circuit to be regulated. The reactor 10 is fitted with a stirrer 18 whose shaft extends upward out of the reactor and is driven by a motor 19. In the example depicted, there is also a product circuit 20 through which the reaction medium present in the reactor is passed through an external heat exchanger 22 by means of a product circulation pump 21. The heat exchange medium used in the external heat exchanger 22 is water which is circulated by means of a second water circulation pump 23 and whose temperature is regulated by means of a second steam line 24 and a second cooling water line 25. The temperature control jacket 14 of the reactor or the external heat exchanger 22 can also be cooled directly by cooling water from lines 17 and 25, respectively, instead of via the cooling circuit shown. Instead of water as preferred cooling medium for the reactor and the external heat exchanger, it is of course also possible to conceive of other cooling media such as cooling brine or the like. This is particularly applicable when the cooling medium introduced via the lines 17 and/or 25 comes from a secondary circuit.

Ideally, one attempts to calculate the heat $Q_{AD}$ which has not been removed and is present in the reactor at a particular point in time as exactly as possible from the cumulative amount of heat introduced and removed. However, in practice it has been found that it is sufficient to take into account only the most important heat flows and to neglect smaller heat contributions which, in addition, can only be measured with difficulty. In the example shown, the method of the present invention is implemented in practice using two part balance zones which are shown schematically in the figure by the rectangles outlined by broken lines and denoted by "A" and "B". The first part balance zone A thus encompasses the polymerization reactor and its bath while the second part balance zone B encompasses the external heat exchanger and its cooling circuit. If, for example, a reflux condenser is used in place of the external heat exchanger in a different reactor configuration, its heat flows can be measured in its own part balance zone.

The boundaries of the balance zones are selected so that the inlet and outlet lines of the respective baths pass through the boundary of the balance zone and the associated water circulation pumps and the feed lines for steam and cooling water lie outside the balance zone. At the balance zone boundaries, temperature and flow of the incoming and outgoing streams are measured. In this way, the small heat input of the circulation pumps 15, 21 and 23 lying outside the balance zone boundaries can also be taken into account indirectly.

If individual feed streams are mixed before introduction into the polymerization vessel, these mixing sections preferably also lie outside the balance zone.

To calculate the amount of heat which has not been removed $Q_{AD}$, the heat content $Q_0$ of the fully empty reactor is set to zero. The balance is then initialized and the heat which has not been removed $Q_{AD}$ and would lead to a rise in the reactor temperature and in the internal pressure in the reactor in the case of a. spontaneous adiabatic runaway reaction is calculated as follows:

$$Q_{AD}(t) = Q_{IN}(t) + Q_{RE}(t) - Q_{OUT}(t)$$

At a given point in time t, the heat which has not been removed is thus given by the difference between the heat $Q_{IN}$ introduced into the reactor up to this time and the heat removed from the reactor $Q_{OUT}$ plus the reaction enthalpy $Q_{RE}$ introduced via the inflow of monomers.

In the process shown in the figure, the following heat flows are advantageously taken into account.

$$Q_{AD}(t) = \int_0^t \dot{Q}_{RE} dt + \int_0^t \dot{Q}_D dt - \left( \int_0^t \dot{Q}_B dt + \int_0^t \dot{Q}_{AWT} dt + \int_0^t \dot{Q}_{ZU} dt + \int_0^t \dot{Q}_H dt \right)$$

where $$\int_0^t \dot{Q}_{RE} dt$$

is the reaction enthalpy introduced via the monomers;

$$\int_0^t \dot{Q}_D dt$$

is the heat introduced by means of direct steam;

$$\int_0^t \dot{Q}_B dt$$

is the heat removed via the bath of the reactor;

$$\int_0^t \dot{Q}_{AWT} dt$$

is the heat removed via the external heat exchanger;

$$\int_0^\tau \dot{Q}_{ZU} dt$$

is the cooling capacity of inflowing starting materials;

$$\int_0^\tau \dot{Q}_H dt$$

the amount of heat used for heating/cooling the reactor contents:

This does not take account of, for example, the heat which is required for or liberated by heating or cooling the reaction vessel itself, the heat introduced by the stirrer and the heat which is given off to the surroundings by radiation and convection.

The amounts of heat are in each case determined from measured values for temperatures or temperature differences and mass flows in a particular time interval $\Delta t$ and the specific heat capacities of the materials involved. In the case of a reaction time of more than one hour, a typical time interval is preferably in the range from 1 to 10 seconds.

The adiabatic temperature rise $\Delta T_{AD}$ or pressure rise $\Delta p_{AD}$ possible at the time t is calculated from $Q_{AD}$. Instead of the integration, a numerical summation is carried out. For this purpose, the period of time from the beginning of the measurement (t=0) to time t is divided into a total of z time intervals and the heat flows measured in each time interval are summed, i.e.

$$\int_0^\tau \dot{Q} dt \rightarrow \sum_{i=0}^{i=z} \Delta Q_i(\Delta t_i)$$

To implement the method of the present invention, the following measurements are therefore required for the heat balance:

mass or volume of all inflows into the polymerization vessel, including the direct steam introduced;

temperatures of all mixed inflows prior to entry into the polymerization vessel;

internal temperature of the polymerization vessel;

temperature difference between inlet and outlet of the bath of the polymerization vessel;

temperature difference between inlet and outlet of the bath of the external heat exchanger;

flow of cooling medium through the bath of the polymerization vessel;

flow of cooling medium through the bath of the external heat exchanger;

absolute internal pressure of the polymerization vessel.

The heat which has not been removed calculated from the heat balance therefore corresponds to the unreacted monomers. In the case of a spontaneous adiabatic reaction, this accumulated heat in the reactor would lead to a temperature increase $\Delta T_{AD}$ and consequently to an increase in the internal pressure in the reactor to $p_{AD}$.

The safety criterion here is that both changes must not lead to the permitted limit values of the reactor being exceeded. As limit values, it is usual to employ the design data for the reactor or the safety valve. Typical values are approximately a maximum permissible temperature of 200° C. and a maximum permissible internal pressure of 15 bar.

The adiabatic temperature rise $\Delta T_{AD}$ is calculated from the heat which has not been removed. $Q_{AD}$ and the mass $m_i$ and the specific heat capacity $cp_i$ of each component i in the reactor, as follows:

$$\Delta T_{AD} = \frac{Q_{AD}}{\sum_i m_i \cdot cp_i}$$

The maximum temperature $T_{AD}$ which can be attained at a particular instant in the case of an adiabatic runaway reaction is then given by the sum of the instantaneous internal temperature in the reactor $T_{RI}$ and the adiabatic temperature rise $\Delta T_{AD}$:

$$T_{AD} = T_{RI} + \Delta T_{AD}.$$

To calculate the steam pressure occurring in the event of an adiabatic runaway reaction, the ideal Gas Law can be employed. The adiabatic pressure is then calculated from the vapor pressures $p_i$ of the monomer feed components i at $T_{AD}$, the vapor pressure of water $p_w$ at $T_{AD}$ and the compression pressure $p_K$ of the inert gas (for example nitrogen) introduced at a pressure $p_0$ into the evacuated reactor prior to commencement of the polymerization.

$$p_{AD} = \sum_i \left( p_i(T_{AD}) \cdot \frac{n_i}{\sum_i n_i} \right) + p_w(T_{AD}) + p_K(T_{AD})$$

where $n_i$ is the mole fraction of the monomer feed component i.

This calculation method is normally satisfactory. However, in the case of components having a high vapor pressure and/or in the case of low fill levels, corresponding to a large free volume, preference is given to using refined calculation methods in order to avoid a too early response of the reaction monitoring system. Large free volumes occur, in particular, at the beginning of the feed stream procedure (for example during prepolymerization). To describe the vapor pressure more exactly during this phase, the free volume can be taken into account. The vapor pressure is then calculated according to the ideal Gas Law with the assumption that the organic and aqueous phases are not miscible or ideally mixed. Likewise, the solubility of the monomers in the polymer can also be taken into account.

As the fill level in the reactor increases and the free volume decreases, inclusion of the free volume in the calculation leads to higher pressures than those which actually exist in the reactor. The total pressure is therefore preferably calculated both with and without inclusion of the free volume. The smaller value is then employed for checking the shutdown criterion.

Further refined calculation methods enable the complex behavior of the reaction mixture in real adiabatic polymerization reactions to be described even better: here, the occurrence of an adiabatic runaway reaction is numerically simulated stepwise starting from the measured instantaneous values for internal temperature and pressure. It is here also possible to take into account, for example, the solubility of the starting materials in the reaction medium, particularly in the polymer formed. In each step, the conversion of a fraction, determined by the total number of steps, of the monomers present in the reactor into polymer is simulated and the effects on the system of the liberation of the corresponding reaction enthalpy are calculated. However, owing to their complexity, such calculation methods require very powerful computer systems. They do, however, show, for example, that the highest pressure $p_{AD}$ occurring in the event of an adiabatic runaway reaction can be reached even before the end of the adiabatic reaction, i.e. before the maximum temperature $T_{AD}$, is reached, and that subsequently a drop in the pressure can even occur.

To avoid human error, the heat balance is preferably started and stopped fully automatically and reaction monitoring is preferably activated and deactivated automatically. There is therefore normally no possibility of external intervention in the system.

In particular cases, for instance, the feeds can be restarted after actuation of the reaction monitoring system with implementation of additional organizational measures and by means of key switches, as long as all monitored parameters are again in the normal range. However, even under these circumstances, it is not possible to intervene in the continuous course of the reaction monitoring process itself.

The cyclic course of the heat balance procedure is divided into four phases which are activated when particular boundary conditions are reached. In the case of permanent monitoring of the reactor, the heat balance is initialized, i.e. the original heat content $Q_0$ is set to zero and all counters are reset, when the reactor is completely empty. The measurement of the temperatures and mass flows is commenced before introduction of the starting materials and the monitoring of the reaction is activated at the latest when the introduction of the monomers is begun. After the reaction is complete, monitoring of the reaction is also ended. The reactor is emptied and when it is completely empty, the monitoring cycle is automatically restarted from the beginning with initialization of the system.

In a preferred variant of the method of the present invention the instantaneous reactor pressure $p_{calc}$ is also calculated in addition to the maximum pressure $p_{AD}$ occurring in the event of a runaway reaction. This calculation is carried out analogously to the calculation model for the adiabatic pressure $p_{AD}$, except that the instantaneous measured reactor temperature replaces the maximum adiabatic temperature $T_{AD}$ as calculation parameter. Owing to the "worst case" assumptions forming the basis of the model, the calculated reactor pressure should always be above the measured internal pressure in the reactor p(t), i.e. the relationship $p(t) \leq p_{calc}(t)$ should be fulfilled. If this criterion is not fulfilled, it can typically be assumed that a measurement is erroneous or the processed measured values differ from the actual measured values.

The continual calculation of the instantaneous internal pressure in the reactor thus serves as a validation of the model for calculating the maximum adiabatic pressure.

Apart from the on-line validation of the model, appropriate integration into an overall monitoring and process control system makes it possible to ensure that a validation of the input data and signals is also carried out at every point in time.

We claim:

1. A method of on-line monitoring and control of monomer conversion in emulsion polymerization in a reactor, which comprises
    a) selecting an initialization time $t_0=0$ and assigning a particular original heat content $Q_0$ to the reactor for this point in time,
    b) as from the initialization time, continuously determining the heat $Q_{IN}$, introduced into the reactor, the reaction enthalpy $Q_{RE}$ introduced and the heat $Q_{OUT}$ removed from the reactor,
    c) calculating the heat which has not been removed $Q_{AD}$ according to the following balance $$Q_{AD}(t)=Q_0+Q_{IN}(t)+Q_{RE}(t)-Q_{OUT}(t),$$

d) calculating the maximum internal temperature $T_{AD}$ which occurs in the case of a spontaneous adiabatic reaction from the heat which has not been removed $Q_{AD}(t)$ and the instantaneous internal temperature T(t) of the reactor and,
    e) if the calculated maximum internal temperature $T_{AD}$ exceeds the instantaneous internal temperature T(t) of the reactor by a particular margin, implementing measures which prevent a further rise in the heat which is not removed $Q_{AD}$.

2. A method as claimed in claim 1, wherein the measures which prevent a further rise in the heat which has not been removed $Q_{AD}$ comprise at least one of throttling back of monomer feed, increasing reactor cooling, and increasing initiator addition.

3. A method as claimed in claim 1, wherein:
    the reactor has inflow lines, outflow lines and a coolant circuit; and
    the $Q_{IN}$, $Q_{RE}$ and $Q_{OUT}$ are determined by means of temperature and mass flow measurements in the inflow and outflow lines of the reactor and in the coolant circuit.

4. A method as claimed in claim 1, wherein the maximum internal pressure $p_{AD}$ prevailing in the reactor at the maximum internal temperature $T_{AD}$ is additionally calculated.

5. A method as claimed in claim 4, wherein further introduction of monomers into the reactor is prevented if the calculated maximum internal temperature $T_{AD}$ and/or the calculated maximum internal pressure $p_{AD}$ exceed prescribed reactor-specific limit values.

6. A method as claimed in claim 1, wherein the initialization time $t_0$ is selected when the reactor is completely empty and the original heat content $Q_0$ is assigned the value zero.

7. A method as claimed in claim 6, wherein the initialization of the method is carried out automatically.

8. A method as claimed in claim 4, wherein the monitoring method is validated by measuring the actual internal pressure in the reactor p(t) and continuously checking adherence to the relationship $$p(t) \leq p_{calc}(t)$$

where $p_{calc}$ is the pressure calculated from the instantaneous internal temperature in the reactor.

9. A method as claimed in claim 3, wherein measurement of temperatures, pressures and mass flows are carried out with at least partial redundancy and a continuous validation of the input parameters is carried out by comparison of the redundant parameters.

10. A method as claimed in claim 1, wherein the emulsion polymerization process is carried out semicontinuously or continuously.

11. A method as claimed in claim 1, wherein:
    the reactor has a monomer feed line and an initiator feed line; and
    the measures which prevent a further rise in the heat which has not been removed $Q_{AD}$ comprise at least one of throttling back of monomer feed, increasing reactor cooling, and increasing initiator addition.

* * * * *

UNITED STATES PATENT AND TRADEMARK OFFICE
CERTIFICATE OF CORRECTION

PATENT NO. : 6,498,219 B1
DATED : December 24, 2002
INVENTOR(S) : Kröner et al.

It is certified that error appears in the above-identified patent and that said Letters Patent is hereby corrected as shown below:

<u>Title page,</u>
Item [22], PCT Filed, should read: -- [22] PCT Filed: Feb. 10, 2000 --

Signed and Sealed this

Nineteenth Day of August, 2003

JAMES E. ROGAN
*Director of the United States Patent and Trademark Office*